Jan. 28, 1958

J. R. GRÉDÉ

2,821,430

GUIDING AND SEALING CHANNEL SLIDEWAY
FOR VEHICLE WINDOW PANES

Filed Dec. 15, 1955

INVENTOR.
JEAN-RAOUL GREDE
by John Joseph Roethel
Attorney

United States Patent Office 2,821,430
Patented Jan. 28, 1958

2,821,430
GUIDING AND SEALING CHANNEL SLIDEWAY FOR VEHICLE WINDOW PANES

Jean Raoul Grédé, Paris, France

Application December 15, 1955, Serial No. 553,373

Claims priority, application France December 17, 1954

3 Claims. (Cl. 296—44.5)

This invention relates to the mounting of sliding glasses in the frames or apertures of doors and windows of vehicles.

It is known that many types of vehicles are provided with sliding glasses adapted to slide in so-called slideways consisting broadly of yielding channel sections lined internally with a soft surface material and fitted generally in fillisters of a door or other body portion.

As a rule, these slideways are made from flat strips manufactured continuously and comprising an inner armature or core of yielding metal, a rubber-like resilient coating in which this armature or core is embedded and, on the inner surfaces frictionally engaged by the glass edges or on certain apparent surfaces, a fibrous covering of fabric, felt or like material; these coated and covered strips are subsequently bent along longitudinal fold lines to obtain the desired channel profile and their structure is such that they can be shaped to conform to the contour of a glass without the transverse profile counteracting this flexure.

To fit the slideway in position the bottom of the U is inserted in a suitable fillister and secured in position therein by using suitable fasteners, but the manufacture and fitting of these fasteners are attended by many difficulties, not to mention the relatively high cost of both.

Now it is the essential object of this invention to provide a new composition of the resilient coating of the inner armature or core whereby the slideway can be inserted in a fillister and then retained automatically therein without the assistance of any auxiliary fixation element or tool, the slideway being mounted in its fillister permanently.

According to this invention this surprising result is obtained by coating the inner yielding metal armature or core of the slideway with any material insensitive to atmospheric agents such as synthetic rubber containing a relatively high percentage of resin and by forming on the coated surface which is to constitute the outer face of the wings of the channel section one or more yielding projections or ribs extending longitudinally throughout the length of the slideway.

The aforesaid projections or ribs are pressed against the inner face of the fillister when the slideway according to this invention is inserted therein and due to the relatively high coefficient of friction developed between these projections or ribs and the inner wall of the fillister any tendency of the slideway to slide out from the fillister is definitely avoided. The slow, progressive drying of the synthetic material constituting the slideway coating will further increase this adherence. Practical tests have given excellent results and demonstrated that even if stresses considerably higher than those normally required for extracting the slideway from its groove were applied thereto this extraction was still impossible. This unexpected result is attributable apparently to the fact that the projections or ribs exert a powerful suction effect holding the slideway in position, and also that the high coefficient of friction thus developed counteracts any creeping of the ribs as the latter will not permit this extraction unless they are turned over at least partially, this movement becoming practically impossible if the profile and thickness of the bottom and top portions of the ribs are properly selected.

On the other hand, this adherence is obtained throughout the length of the slideway and on either side thereof, and it is not limited to a few locations as usually observed when fixation members are used.

The permanent stability of the aforesaid automatic fixation effect is obtained by selecting a coating of synthetic rubber or any other material insensitive to oxidation and ozonization and free from ageing likely to alter the cross-sectional shape of the slideway.

It will be readily understood that the number of ribs provided on either side of the slideway may vary but it appears that one or two ribs per side are sufficient to provide the desired result.

Now it was also found that this unforeseen effect of automatic fixation could be improved considerably if the coating, along the marginal portions of the channel wings, is not covered with the conventional surface covering of felt or fabric concealing the aforesaid coating in the visible portions of the slideway, for the presence of this felt or fabric promotes the creeping and, more particularly, creates a substantial excess thickness so that the ribs to be effective must project beyond the felt or fabric fibres and therefore have a considerable height; in this case the ribs are far too flexible and their efficiency is impaired. However, it is evident that the rubber coating cannot be left bare as its appearance would not be satisfactory.

Consequently and in accordance with a complemental feature of this invention the conventional fabric or felt surface covering is replaced by a fibrous covering formed by projecting hair or threads thereon through the so-called tufting process whereby the hair or threads adhere on the surface of the rubber coating previously coated in turn with a suitable adhesive such as quick-drying synthetic resin adhesive. Thus, the resulting surface covering is more practical and economical, and has the additional advantage of combining a very low thickness with non-creep characteristics. By reason of the moderate thickness of this surface covering the marginal portions of the channel wings—which may be limited if desired to a zone representing but a small fraction of the slideway height—the choice of the positions, shapes and dimensions of the ribs according to this invention is no more subordinate to the presence of the surface covering, or to its height and thickness.

The fibrous coating of the slideways may be effected as already stated according to the so-called tufting process, for example according to the method disclosed in the co-pending application of the same inventor, Serial No. 553,390, filed December 15, 1955, for "Guiding Strips for Sliding Glasses of Vehicles and Method of Manufacturing Same," and now abandoned. The hair or threads constituting the pile obtained through this method may be of wool or any other convenient synthetic or natural origin.

Of course, though the slideways according to this invention may be inserted and retained automatically in fillisters without using any fixation members or operations, it would not constitute a departure from this invention to secure these slideways in position by using the conventional means (fasteners or the like) when it is not intended to secure the slideways in the usual fillisters or like grooves.

In order to afford a clearer understanding of this invention and of the manner in which the same may be carried out in the practice, reference will now be made to the accompanying drawing forming part of this specification and showing diagrammatically by way of example one form of embodiment of the invention. In the drawing.

Figure 1:
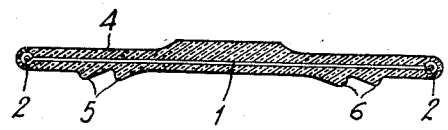
Figure 1 is a cross-sectional view showing a flat yielding strip with a resilient coating of rubber or like material, before the fibrous surface covering is applied thereto.
Figure 2:
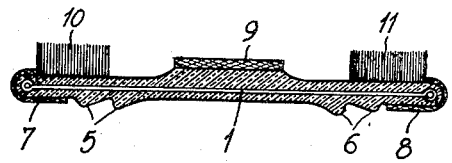
Figure 2 is a similar view showing the same strip after the application of a fibrous surface covering by the so-called tufting method.
Figure 3:
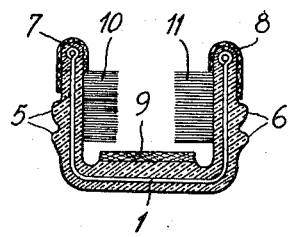
Figure 3 is a similar view showing a slideway formed by bending the strip of Figure 2 to a channel shape.
Figure 4:
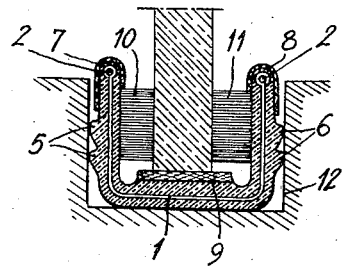
Figure 4 is another cross-sectional view showing the same slideway after fitting same in a fillister or like groove.

In the example shown in the drawing the strip of Figure 1, comprises an inner yielding armature or core 1 for example of perforated metal with marginal reinforcing beads 2; this armature is embedded completely in a coating layer 4 of synthetic rubber or equivalent material, by passing through the die of an extruding machine forming longitudinal ribs 5, 6 in the two symmetrical zones of the strip which are to constitute the outer lateral faces of the slideway when the strip has been subsequently bent to a channel or U shape.

Prior to the bending operation this strip is then treated with the so-called tufting process to form two marginal zones 7, 8 round the beads 2 and a central zone 9, on the upper face of the strip, these zones consisting of densely matted hair or threads; the central zone 9 is intended to constitute the glass-receiving inner bottom of the channel. Besides, two lateral zones 10, 11 are covered with pile consisting of upright threads projecting at right angles to the strip surface, these lateral zones 10, 11 being intended to constitute the inner lateral faces of the channel wings and to engage the corresponding lateral surfaces of the edge of a sliding glass. The above-mentioned zones of matted-threads may be replaced either by other portions of shorter pile or projecting threads, or by tufted powder.

Preferably, the thickness of the ribs 5, 6 decreases in the outwards direction and on the other hand these ribs may be oblique with respect to the strip surface, their edges being directed upwards, i. e. towards the longitudinal edge of the strip which is to constitute the edge of the channel wing. Thus, the slideway may be easily introduced by the fillister 12 by compressing and folding the ribs against the strip as the slideway is depressed in the fillister. On the other hand, when the slideway is pulled outwards this tends to turn the ribs and since their edges cannot slide on the inner surface of the fillister, this turning movement cannot take place unless the ribs and fillister are expanded transversely. Since this expansion of the fillister cannot take place the ribs cannot turn or creep and are definitely held in the fillister groove from which they cannot be extracted even if they were subjected to stresses far beyond those normally encountered under normal service conditions.

It will be noted that the very moderate thickness of the fibrous coverings 7, 8 does not interfere with the efficient locking action of the ribs 5, 6, even if the latter are relatively thin.

Although the attached drawing illustrates a slideway comprising only two ribs on either side it will be readily understood that this number is not compulsory and that it may be increased or reduced to a single rib.

I claim:

1. A substantially U-shaped glass run channel for guiding and sealing a sliding glass in a vehicle body member, said channel comprising a metal core member having a base and a pair of leg sections extending integrally from opposite sides thereof, said metal core member being coated on the inner and outer sides thereof with a synthetic rubber containing a relatively high percentage of synthetic resin, the outer extremities of said leg sections and the inner central portion of the base being covered with a densely matted fibre, the inner lateral surfaces of the leg sections being covered with a dense pile projecting at right angles to said lateral surfaces, each leg section outer surface being provided with at least one longitudinally extending rib located between the matted fibre covering the upper edge thereof and said base, said rib being provided with a lip constructed and arranged to be folded toward the outer surface of said leg section as said channel is inserted in a vehicle body member channel receiving recess and to coil away from said outer surface to resist withdrawal of said channel from its receiving recess.

2. A substantially U-shaped glass run channel for guiding and sealing a sliding glass in a vehicle body member, said channel comprising a metal core member having a base and a pair of substantially parallel leg sections extending integrally from opposite sides thereof, said metal core member being coated on the inner and outer sides thereof with a synthetic rubber containing a relatively high percentage of synthetic resin, the outer extremities of said leg sections and the inner central portion of the base being covered with a densely matted fibre, the matted fibre covering said outer edges overlapping both the inner and outer lateral surfaces of said leg sections, the inner lateral surfaces of the leg sections being partially covered between the matted fibre and said base with a tufted pile having the threads thereof projecting at right angles to said lateral surfaces, each leg section outer surface being provided with at least one longitudinally extending rib located between the matted fibre covering the upper edge thereof and said base, said rib being provided with a lip constructed and arranged to be folded toward the outer surface of said leg section as said channel is inserted in a vehicle body member channel receiving recess and to coil away from said outer surface to resist withdrawal of said channel from its receiving recess.

3. A substantially U-shaped channel adapted to be received in a channel retaining recess in a vehicle body member, said channel comprising a metal core member having a base and a pair of leg sections extending integrally from opposite sides thereof, said metal core member being coated on the inner and outer sides thereof with a synthetic coating of synthetic rubber containing a relatively high percentage of synthetic resin, said synthetic coating being characterized by being insensitive to oxidation and ozonization and free from ageing, said synthetic coating on the outer surface of each leg section being formed to provide at least one longitudinally extending rib located between the outer edge and the base thereof, the rib being provided with a lip constructed and arranged to be folded toward the outer surface of the leg section as said channel is inserted in said receiving recess and to coil away from said outer surface to resist withdrawal from said recess.

References Cited in the file of this patent

UNITED STATES PATENTS 2,726,894   Bugbee _____ Dec. 13, 1955

FOREIGN PATENTS 704,459   Great Britain _____ Feb. 24, 1954